No. 787,234. PATENTED APR. 11, 1905.
F. C. TORRANCE.
RATCHET DRILL.
APPLICATION FILED JULY 22, 1903.
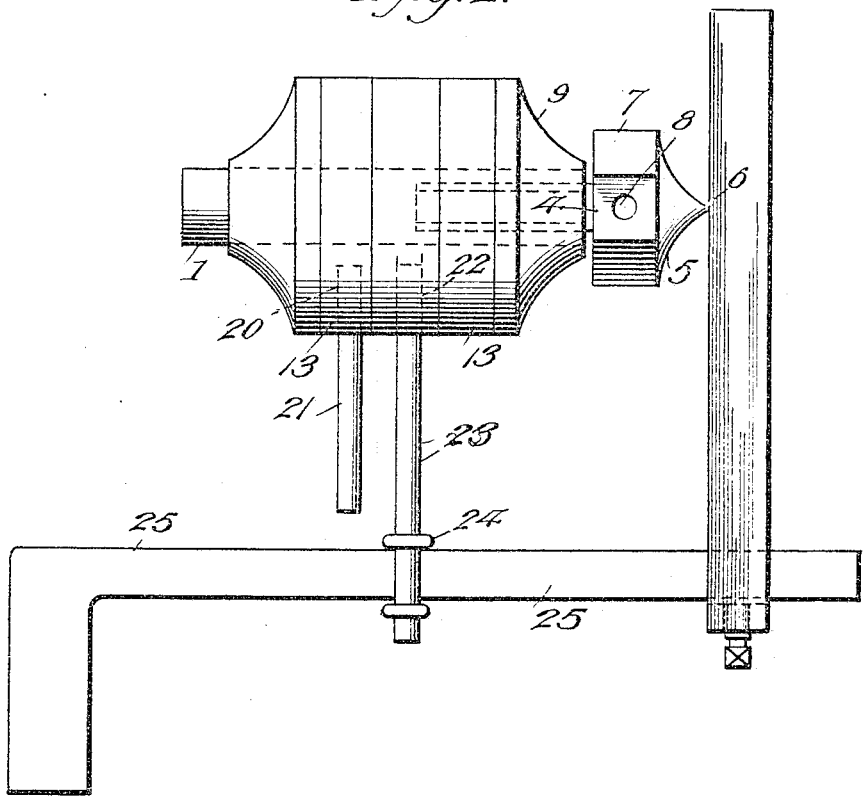
WITNESSES:
INVENTOR
Francis Claude Torrance
BY
Victor J. Evans
Attorney No. 787,234.

Patented April 11, 1905.

UNITED STATES PATENT OFFICE.

FRANCIS CLAUDE TORRANCE, OF ERIE, PENNSYLVANIA.

RATCHET-DRILL.

SPECIFICATION forming part of Letters Patent No. 787,234, dated April 11, 1905.

Application filed July 22, 1903. Serial No. 166,618.

*To all whom it may concern:*

Be it known that I, FRANCIS CLAUDE TOR-RANCE, a citizen of the United States, residing at Erie, in the county of Erie and State of Pennsylvania, have invented new and useful Improvements in Ratchet-Drills, of which the following is a specification.

This invention relates to ratchet-drills.

The objects of the invention are to improve and simplify the construction of such devices.

With the foregoing and other minor objects in view, which will appear as the description proceeds, the invention resides in the particular combination and arrangement of parts and in the precise details of construction hereinafter described and claimed as a practical embodiment thereof.

In the accompanying drawings, Figure 1 is a central longitudinal section through a ratchet-drill constructed in accordance with the present invention. Fig. 2 is a side elevation of the same, showing the drill adapted for use as a double-action drill.

Like reference-numerals designate corresponding parts in all the figures of the drawings.

The drill contemplated in this invention comprises, essentially, a central longitudinal shaft or arbor 1, provided at one end with a socket 2 to receive the shank of the drill-point, while the opposite end of said shaft or arbor is provided with an internally-threaded bore 3, in which is received the exteriorly-threaded shank 4 of the feed-screw and centering device, said shank being provided at one end vice, said shank being provided at one end with a centering head 5, provided with a point 6 and having its outer face provided with a series of wrench-engaging surfaces 7 and also provided with a series of sockets or holes 8 to receive an adjusting-lever, by means of which the feed-screw may be operated for advancing the shaft or arbor 1 and the drill carried thereby.

At or near the opposite ends of the shaft 1 are end collars 9, which are made fast upon the shaft by means of set-screws 9ª or any other convenient means. Extending centrally around the shaft or arbor 1 is a sleeve or collar 10, forming a pinion-carrier, the same being provided with suitable journals 10ª, upon which are rotatably mounted pinions 11, the same being received in slots 12, formed in the collar 10, as shown in Fig. 1. Upon opposite sides of the central collar or pinion-carrier 10 and between said carrier and the end collars 9 are interposed dog-carrying sleeves 13, the same being free to rotate around the shaft 1 when the device is used as a double-action drill. The outer surfaces of the sleeves 13 are recessed, as shown at 14, to receive ratchet-wheels 15, having a fixed relation to the shaft or arbor 1, being preferably secured to the fixed end collars 9 by means of screws 15ª. The sleeves 13 are provided with openings leading inward from their peripheries, and each of said openings has mounted therein a dog 16, which is normally pressed inward by means of a spring 17, coiled around the dog and bearing at its outer end against a plug 18, preferably screwed into the said opening, as clearly shown in Fig. 1. The inner ends of the dogs 16 engage the teeth of the ratchet-wheels 15 to turn said ratchet-wheels in one direction or the other, according to the direction in which the shaft or arbor is to be rotated.

Secured to the inner faces of the sleeves 13 by means of screws 13ª are gear-wheels 19, which mesh at diametrically opposite points with the pinions 11. As one sleeve 13 is turned in one direction the other sleeve 13, through the medium of the gear-wheels 19 and pinions 11, is turned in an opposite direction, and as said sleeves 13 communicate their motion through the ratchet devices to the shaft or arbor it will be seen that said shaft is turned in whichever direction the sleeves 13 are rotated.

One of the sleeves 13 is provided with a socket or opening 20 to receive an operating lever or handle 21, which constitutes the double-action lever of the drill. The centrally-arranged sleeve or pinion carrier 10 is also provided with a similar socket 22 to receive a single-action lever or handle 23, and said lever or handle is made somewhat longer than the lever 21, so that it may be secured, by means of a coupling device 24, to an adjacently-arranged brace or beam 25, thus enabling the pinion-carrier to be held stationary, while the sleeves 13 are rotated in opposite directions at each side thereof.

From the foregoing description it will be seen that by operating the single-action lever 23 both of the sleeves 13, as well as the pinion-carrier 10, are simultaneously rotated in the same direction. By fastening the pinion-carrier in the manner shown in Fig. 2 and holding said pinion-carrier stationary and by operating one of the sleeves 13 both of the sleeves 13 are caused to rotate and impart motion to the shaft or arbor of the drill, thus producing a double action and enabling the operator to drill more rapidly. As the hole is drilled the drill may be advanced by turning or adjusting the feed-screw 4 in a manner which will be readily understood.

I wish it to be understood that I attach importance to the construction of the collars, sleeves, and pinion-carrier, whereby they form a complete inclosing casing for the operating mechanism of the structure, thereby excluding foreign substances from coming in contact with said mechanism.

Having thus described the invention, what I claim as new is—

A ratchet-drill comprising an arbor having feeding means, a pair of separated collars on said arbor, screws rigidly connecting said collars with said arbor, a gear-wheel detachably connected with each of said collars, a pair of dog-carrying sleeves surrounding said arbor, each of the sleeves being recessed to receive the detachable gear-wheel on the adjacent collar, movable dogs in each of said sleeves, coil-springs surrounding said dogs, removable plugs in said sleeves against which the coil-springs bear, a gear-wheel secured to each of said dog-carrying sleeves, a pinion-carrier surrounding said arbor between said dog-carrying sleeves, said collars, sleeves and pinion-carrier being constructed and arranged to form a complete inclosing casing for the operating parts, pinions journaled on the periphery of said pinion-carrier and meshing with gear-wheels on the dog-carrying sleeves, a lever for rotating said dog-carrying sleeves, and a lever for rotating said pinion-carrier, substantially as specified.

In testimony whereof I affix my signature in presence of two witnesses.

FRANCIS CLAUDE TORRANCE.

Witnesses:
FRANK TORRANCE,
SIMON REED.